US007222362B1

(12) United States Patent
Canetti et al.

(10) Patent No.: US 7,222,362 B1
(45) Date of Patent: May 22, 2007

(54) NON-TRANSFERABLE ANONYMOUS CREDENTIALS

(75) Inventors: Ran Canetti, New York, NY (US); Moses Samson Charikar, Stanford, CA (US); Sridhar Rajagopalan, San Jose, CA (US); Shanmugasundaram Ravikumar, San Jose, CA (US); Amit Sahai, Thousand Oaks, CA (US); Andrew S. Tomkins, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/571,602

(22) Filed: May 15, 2000

(51) Int. Cl.
*G06F 7/04* (2006.01)
(52) U.S. Cl. ............... 726/5; 726/18; 713/155
(58) Field of Classification Search ........... 713/200, 713/201, 169, 155; 726/5, 18
See application file for complete search history.

(56) References Cited

U.S. PATENT DOCUMENTS

| 4,748,668 | A | * | 5/1988 | Shamir et al. ............... 380/30 |
| 5,521,980 | A | * | 5/1996 | Brands ........................ 380/30 |
| 5,812,670 | A | * | 9/1998 | Micali ......................... 705/74 |
| 6,141,750 | A | * | 10/2000 | Micali ........................ 713/168 |
| 6,148,404 | A | * | 11/2000 | Yatsukawa ................. 713/200 |
| 6,263,446 | B1 | * | 7/2001 | Kausik et al. .............. 713/201 |
| 6,320,966 | B1 | * | 11/2001 | Brands ......................... 380/59 |
| 6,510,523 | B1 | * | 1/2003 | Perlman et al. ............. 713/201 |
| 6,643,774 | B1 | * | 11/2003 | McGarvey .................. 713/155 |

OTHER PUBLICATIONS

Anna Lysyankaya, Ronald L. Rivest, Amit Sahai, Stefan Wolf. "Pseudonym systems." Selected Areas in Cryptography 1999 : 184-199.*
Pashalidis et al. A Security Model for Anonymous Credential Systems (2001).*
Chaum, David, "Showing Credentials Without Identification," *Proceedings of Advances in Cryptology, Springer LNCS*, 453: 246-264, 1990.

* cited by examiner

*Primary Examiner*—Christopher Revak
*Assistant Examiner*—Kaveh Abrishamkar
(74) *Attorney, Agent, or Firm*—Ramraj Soundararajan; IP Authority, LLC (57) ABSTRACT

An anonymous credential system which requires a user who is asserting a credential to have knowledge of the master key of the user who was originally granted that credential. In order for a user to transfer the ability to assert any one of their credentials to another user, they must also transfer their master key to that same user. The master key, however, provides such unlimited rights to its holder that a user is strongly motivated not to share their master key with anyone else. In this manner, anonymous credentials become non-transferrable because a user cannot transfer a credential without transferring their entire electronic identity.

20 Claims, 6 Drawing Sheets

NON-TRANSFERABLE ANONYMOUS CREDENTIALS

FIELD OF INVENTION

The present invention relates generally to the field of cryptographic protocol systems. More specifically, the present invention is related to anonymous credentialing schemes.

DISCUSSION OF PRIOR ART

Privacy is of critical concern to Internet users and many other people in the current electronic age. Organizations with which people interact often have large amounts of data regarding the identity of these people and the details of their interactions. While privacy concerns are raised by the possibility of a single organization's use (or misuse) of a database of such information, these concerns are especially heightened when multiple organizations cross-correlate their databases.

One way to protect the privacy of individuals is to maintain their anonymity during interactions with organizations. As one solution, David Chaum of MIT proposed anonymous credential (AC) systems in a paper entitled "Showing Credentials Without Identification" *Proceedings of Advances in Cryptology, Springer LNCS*, 453:246–264, 1990. In essence, a user interacts with multiple organizations with different, unlinkable pseudonyms after initially being granted credentials for the different pseudonyms. Under this type of credential system, organizations are able to validate possession of a credential, for instance a credit card, without exposing the relationship between the user's different pseudonyms or the user's public identity.

AC systems are powerful and effective tools for protecting the identity of individual users. In fact, these tools are perhaps too powerful. The total anonymity which they grant users allows free transferability of credentials among users. Some organizations consider free-transferability to be an unacceptable side-effect of AC systems. As an example, after some type of payment or other transaction, washingtonpost.com typically grants users a credential which allows unlimited access to its web site. Under traditional AC systems it is possible for a user to share his credential with his friends and even to broadcast it to the population at large.

Other shortcomings of traditional AC systems include untraceability and linkability. Untraceability prevents organizations from determining the identity of a user who has asserted a credential to them, even when such a determination is necessary and done legitimately. Linkability is the ability to link different assertions of the same credential—even without knowing the identity of the user with the user's consent.

Whatever the precise merits, features and advantages of prior art in this field of interest, they do not achieve or fulfill the purposes of the present invention. The prior art anonymous credential systems do not prevent users from exchanging credentials with other users even if the organization which originally granted a credential would like to prevent its transfer. Without the ability to prevent credential transferability, prior art AC schemes also fail to have simple mechanisms to implement features such as traceability, linkability and unforgeable receipts. These and other objects are achieved by the detailed description that follows.

SUMMARY OF THE INVENTION

The present invention is a compromise between the user's right to anonymity and the organization's right to control access to its services. As with traditional AC systems, in the process of granting a credential, a user will verifiably identify himself to the credential-granting entity and will be given an anonymous credential in return. In subsequent interactions with any other organization, the user is able to assert the fact that he holds a credential, without revealing his identity. In addition, however, the present invention discourages a user from transferring his credentials to other users.

In the present system, every user, U, has a master key which the user is strongly motivated never to share with other users. The master key is the equivalent of U's electronic identity. With the master key, a user is able to, for example, access U's bank account, purchase items in U's name, commit U to legally-binding transactions, and to even request other subsidiary credentials in U's name. The present invention discourages the transfer of credentials in the sense that any user who transfers their ability to assert possession of any one credential, must in this process, also transfer their master key; something they are not willing to do. This requirement is enforced by requiring that any user asserting a credential must prove their knowledge of the master key of the user to whom the credential was originally granted; therefore, any credential transferred without the accompanying master key is not assertable. Along with non-transferability, the present invention allows varying levels of anonymity which permits traceability, linkability and unforgeable receipts to be implemented within AC systems utilizing its features.

The present invention's approach to anonymous credentials is quite flexible, in the sense that it is adjustable to provide different levels of anonymity. One important issue to organizations, is the possibility of misuse of credentials. Organizations frequently issue credentials that are potentially damaging, for example the right to make charges on a company account or the right to make high-risk decisions. In the case of misuse of credentials, the present invention provides to the organization traceability: with the consent of an authorized judge, the organization has the ability to determine the identity of the user responsible for a particular exercise of a credential.

A traceable scheme, however, is not necessarily secure against the abuse by the party responsible for accepting credentials (i.e. the doorkeeper). The doorkeeper could accept unauthorized credentials while reporting that it gave access to an authorized user. By another token, an honest doorkeeper will frequently want to obtain proof that any accepted credential came from an authorized user. To meet these concerns, the present invention require that doorkeepers be able to produce unforgeable receipts to an organization; these receipts reveal the identity of the asserting user as well as the legitimacy of the transaction to an authorized judge. Thus a doorkeeper cannot produce false evidence of access, unless he/she is in league with some authorizaed user, and, in this case, the identity of this user will be revealed in the receipts. Furthermore, linkable schemes are also provided which enable doorkeepers to link different assertions of the same credential with the user's consent.

DESCRIPTION OF THE PREFERRED EMBODIMENTS

While this invention is illustrated and described in a preferred embodiment, the device may be produced in many different configurations, forms and materials. There is depicted in the drawings, and will herein be described in detail, a preferred embodiment of the invention, with the understanding that the present disclosure is to be considered as a exemplification of the principles of the invention and the associated functional specifications of the materials for its construction and is not intended to limit the invention to the embodiment illustrated. Those skilled in the art will envision many other possible variations within the scope of the present invention.

One tool that the present invention relies heavily upon, and that is well known in the field of cryptographic protocols, is that of zero-knowledge proofs of knowledge. Abstractly, a zero-knowledge proof is an interactive two-party protocol with a "prover" and a "verifier". The prover convinces the verifier the truth of a statement without revealing any information which would enable the verifier, in turn, to prove the statement to any third party. If proving the statement requires knowledge of some secret, the prover convinces the verifier that he knows the secret, but does not reveal it in the process.

Proofs of knowledge are often used as proofs of identity. In the parlance of cryptography experts, an example zero-knowledge proof of identity works in the following manner. A trusted center chooses $n=p \cdot q$ and publishes n but keeps p and q secret. A prover, Alice, chooses a secret, s, with the property $GCD(s,n)=1$. Alice then publishes $v=s^2 \pmod n$. When Alice wants to prove knowledge of s, and consequently her identity, to Bob the following steps are repeated:
  a) Alice chooses random number, r, and sends $r^2 \pmod n$ to Bob.
  b) Bob chooses random number, e, where $e \in \{0, 1\}$, and sends it to Alice.
  c) Alice responds with $a=rs^e \pmod n$
  d) Bob checks if $a^2=v^e r^2 \pmod n$ If Alice follows this protocol and knows s, then Bob's check will always work; however, if Alice does not know s then she can only answer the question correctly with a probability of 0.5. Iterating the above sequence 20 times gives a party a maximum probability of $2^{-20}$ of answering correctly if they do not know s (i.e. they are not Alice).

A preferred embodiment of the present invention is detailed below which utilizes zero knowledge proofs of knowledge (ZKPK). The present protocol does not necessarily rely on ZKPK but is also effective with non-ZK proofs.

The traditional anonymous credential schemes which utilize the above, or a similar, tool, typically involve a number of different players.

USERS: There are users $U=\{U_1, U_2, \ldots\}$.

CREDENTIAL GRANTING ORGANIZATIONS: There are organizations $O=\{O_1, O_2, \ldots\}$. Each $O \in O$ has the power to grant credentials of the form O::x, where x is the name of the credential, to user $U \in U$.

DOORKEEPERS: There are doorkeepers $D=\{D_1, D_2, \ldots\}$. Each Doorkeeper $D \in D$ interacts with $U \in U$ when approached. In general, no communication is required between Organizations and Doorkeepers, other than in the case there is a conflict which requires the tracing of an exercise of a credential. The DoorKeepers will and can accept any credential they choose to. The credential has the identity of the credential grantor embedded explicitly in it. A good physical analogy is a state driver's license which is granted by many different Credential Granting Organizations, and used independently by many DoorKeepers as either 1) a proof of the ability to drive or 2) a proof of age or other authorizations granted to the credential holder.

PLAYERS: The set of all players is $P=U \cup O \cup D$. Each player $P \in P$ has an externally-specified, unique name $N_P$ which is the player's "identity".

AC systems, or schemes, should have the following properties. Completeness: a user is able to assert the credentials he receives to any doorkeeper. Anonymity: no coalitions can identify a user that asserts holding a credential. Validity: no coalition of users, organizations, and doorkeepers can assert a credential that was not granted to them. Unlinkability: no coalition of doorkeepers and organizations can link two assertions of any credential as coming from the same user.

In order to focus the description of the present invention on the aspects of anonymity and non-transferability of credentials, an underlying model of communication called the "anonymous sessions model" is assumed. In this model, players initiate anonymous sessions with other players of their choice and are guaranteed throughout the session that all messages received are authentic and were sent by the other player. Figuratively, this model resembles communication by phone (without caller-ID), where a phone conversation represents a session. The caller knows the identity of the callee, whereas the callee does not know who the caller is. Still, both parties trust the conversation is authenticated and that their peer remains unchanged throughout the session. These properties can be ensured over a public network like the Internet, for instance, by using public key cryptographic systems.

Furthermore, all sessions are assumed to be secure in the sense that eavesdropping or modifying messages is not possible.

The above assumptions are not required by the present invention. These assumptions merely simplify the following discussion and explanation of the protocols of the present invention and allow the focus to be on its inventive aspects.

The intuition behind non-transferability is that every time an assertion of some credential (denoted O::x) to an uncorrupted doorkeeper succeeds, the user who made the assertion must be in possession of the master secret key of the user actually granted O::x. This definition is formalized in terms of the existence of an extractor that is able to extract the master secret key:

An anonymous non-transferable credential scheme (ANTC-scheme) is an AC-scheme such that there exists a probabilistic expected polynomial time machine E (the extractor) with the following property. For every successful assertion event of the form "U asserts O::x to D", where O and D are uncorrupted and O::x is a credential that was granted only to some set $\{U_i\}$ of users, machine E when given oracle access to user U in the state just before beginning the assertion protocol will output the master secret key of some user in $\{U_i\}$.

This definition captures the intuition that U knows the master secret key of some $U_i$. One slight relaxing of this definition, that is also contemplated within the scope of the present invention, is allowing the extractor E to also have access to any zero-knowledge interaction with any $U_i$, the idea being that whatever E finally extracts must be from the knowledge of U, since the interactions with $U_i$ were zero-knowledge.

The current invention is presented below in terms of different types of protocols. The first type of protocols require only general assumptions such as the existence of one-way functions and encryption schemes. Another type of protocol is based on the hardness of computing discrete logarithms modulo a large prime and upon a signature scheme that is unforgeable against chosen message attack. The broadest concepts of the invention are best introduced in terms of the protocols with more general assumptions. After these protocols are described, subsequent paragraphs provide the details of particular embodiments of the present invention. However, as the assumptions become more detailed, the corresponding protocols become more economical to implement.

In particular, each protocol, as in traditional AC schemes, comprises 4 separate phases of communication between different parties: Announce Player, Request Credential, Grant Credential and Assert Credential. Each protocol is thus fully explained by describing the rules of each party's behavior during the four phases. Of particular importance to the present invention, are those rules which require a user asserting a credential to have (and be able to prove) knowledge of a master secret.

In each of the following protocols, every user, U, has a master public key and private key pair $<E_u, D_u>$, and there exists a function PUBLIC, known to all, such the PUBLIC $(D_u)=E_u$. $D_u$, however, is a secret known only to U and not to any other party.

As for notation, if E is an encryption key, then E(x) means running an encryption algorithm (many are well known in the art) using key E on x. Similarly, if S is a signing key, then S(x) means performing a signature on x using S as the signing key.

PROTOCOLS UNDER GENERAL ASSUMPTIONS

Two particular protocols having only general assumptions are described. The first is simpler than the second, and requires only the availability of one-way functions; however, the first fails to achieve non-transferable sessions. The second protocol provides for non-transferable sessions but requires an encryption scheme secure against adaptive chosen ciphertext attack.

1) Without non-transferable sessions:

Given any public commitment algorithm C and a signature scheme T (existentially unforgeable against adaptive chosen message attacks), both constructed based on one-way functions, the following communications comprise the first protocol.

Announce Player, $AP(N_p)$:

FIG. 1$a$ illustrates the operation of the $AP(N_p)$ phase 104 of the protocol.

Figure 1A:
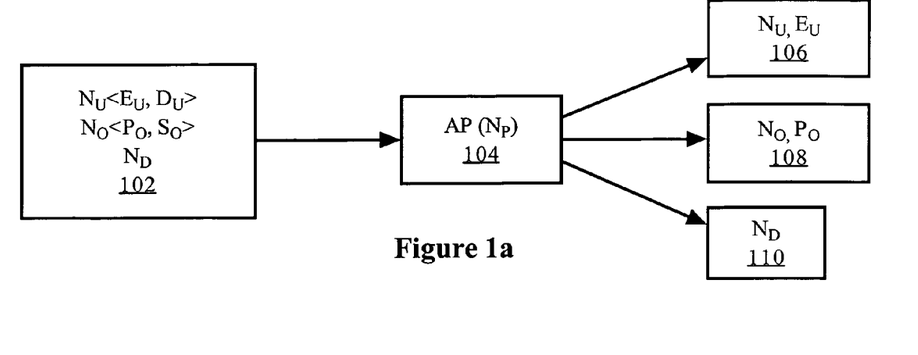
FIGS. 1a–1d together illustrate the four communication phases of one embodiment of the present invention.

If player, $N_p$ 102, is a user, U, then U picks a master secret $D_u$ and sets $E_u=C(D_u)$ and announces $(N_u, E_u)$ 106 to all other players.

If player, $N_p$ 102, is an organization, O, then it chooses public and private signing keys $P_o$, $S_o$ for $\Gamma$ and announces $(N_o, P_o)$ 108 to all other players.

If player, $N_p$ 102, is a doorkeeper, D, then D simply announces $N_D$ 110 to all other players.

FIGS. 1$b$ and 1$c$ illustrate the players involved and the message traffic of the phases of the protocol which allows the requesting and granting of a credential.

Figure 1B:
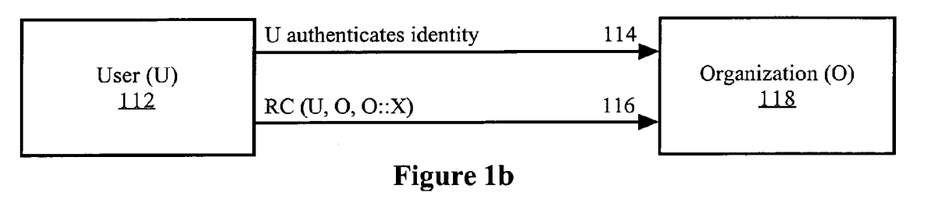

Request Credentials, RC(U, O, O::x):

The user, U 112, first authenticates 114 himself to organization O 118 by giving a zero-knowledge proof of knowledge of his master secret key, $D_u$. If U 112 fails, O 118 proceeds as if U 112 is an unauthenticated user. U 112 then gives his request 116 to O 118.

Figure 1C:
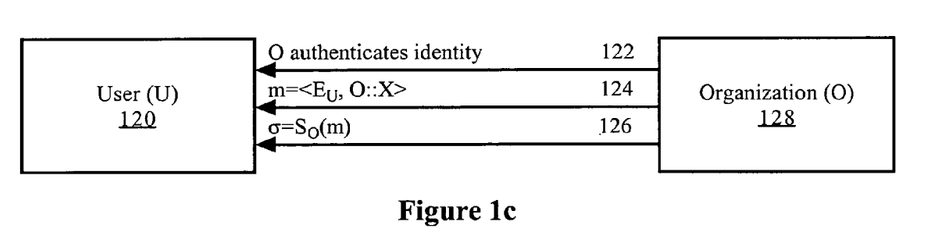

Grant Credentials, GC(O, U, O::x):

O 128 authenticates himself to U 120 using his signing key, and relays the message m=$<E_u$, O::x> 124. Also, O 128 then presents a signature $\sigma=S_o(m)$ 126 to U 120 who verifies the signature is valid. If any verification step fails, the verifying party assumes that the other party sent an "abort" message.

FIG. 1$d$ illustrates the phase of communication in which a user attempts to assert a credential to a doorkeeper.

Figure 1D:
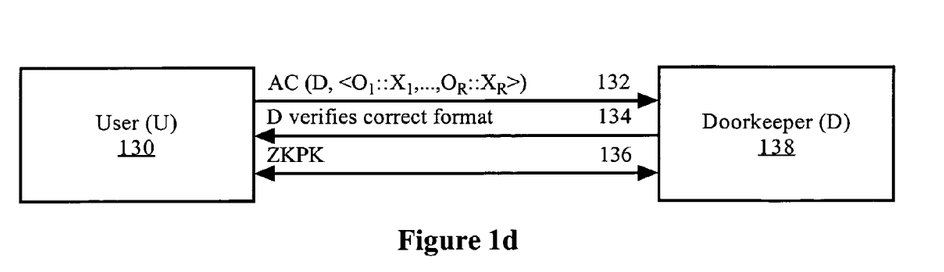

Assert Credentials, AC(D, $<O_1::x_1, \ldots O_k::x_k>$):

If U 130 has been granted credential $O_i::x_i$ then the GC(•) protocol returned a string of the form $\sigma_i=S_{oi}(m_i)$ for the message $m_i=<E_U, O_i::x_i>$. Now, U 130 sends AC(D, $<O_1::x_1, \ldots O_k::x_k>$) 132 to D 138 who verifies that the format of the message is correct 134. Then, U 130 initiates, and D 138 verifies, a zero-knowledge proof of knowledge (ZKPK) 136 to prove the following statement:

$\exists \sigma_1, \ldots, \sigma_k, m_1, \ldots, m_k$, s such that $\forall i 1 \leq i \leq k$, $\sigma_i=S_{Oi}(m_i)$ and $\forall i 1 \leq i \leq k$, $m_i=<C(s), O_i::x_i>$ and $E_u=C(s)$ If verification fails during the first step, D assumes no message has been received. If D's verification fails during the second step then D assumes that all asserted credentials were invalid. If D's responses during the ZKPK fail then U assumes that D has sent an "abort" message. If all verification succeeds, D assumes that the credentials asserted were indeed valid.

To see that this scheme is non-transferable is simple: the zero-knowledge proof of knowledge used to perform the assertion allows an extractor that extracts the master secret key of the user. The scheme is anonymous since the interaction between U and D is ZK.

FIGS. 2$a$ through 2$d$ illustrate the same 4 phases of communication but in an embodiment of the present invention which provides non-transferable sessions.

2) Non-transferable sessions:

Non-transferrable sessions mean that a user is prevented from properly asserting a credential and then, once authenticated, transferring the session to another user (thereby circumventing the idea behind non-transferrable credentials).

Figure 2A:
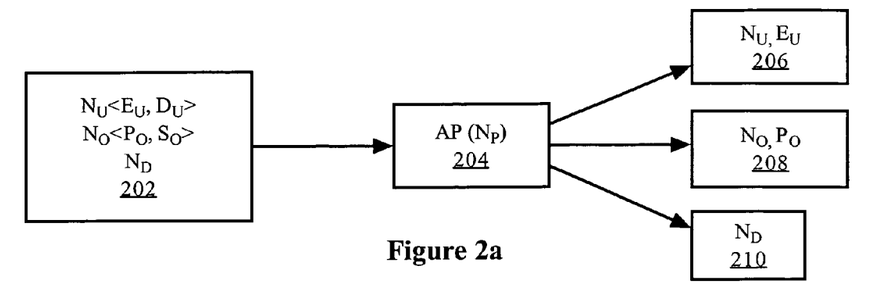
FIGS. 2a–2d together illustrate the four communication phases of a second embodiment of the present invention.

In order to allow the above protocol to also provide non-transferable sessions requires an encryption scheme η secure against adaptive chosen ciphertext attacks. This second protocol provides the following communications:

Announce Player, $AP(N_p)$:

If the player 202 is a user, U, then U picks a master public and private keys according to the encryption scheme η and broadcasts $(N_U, E_U)$ 206.

If the player 202 is an organization, O then it chooses public and private signing keys $P_O$, $S_O$ for signature scheme $\Gamma$ and announces $(N_o, P_o)$ 208.

If the player 202 is a doorkeeper, it simply announces $N_D$ 210.

Figure 2B:
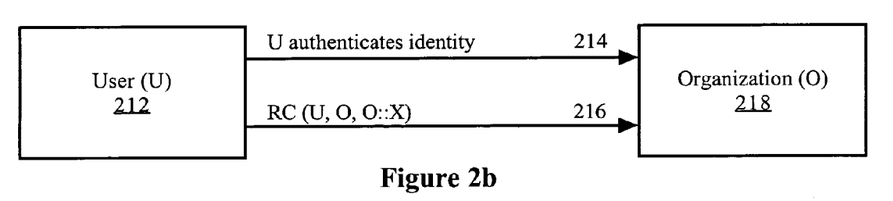

Request Credentials, RC(U, O, O::x):

U 212 authenticates himself to O 218 using $E_U$ (essentially allowing O to perform a chosen ciphertext attack) 214. If U fails, O and U proceed as if U were an authenticated user. U then gives his request to O 216.

Figure 2C:
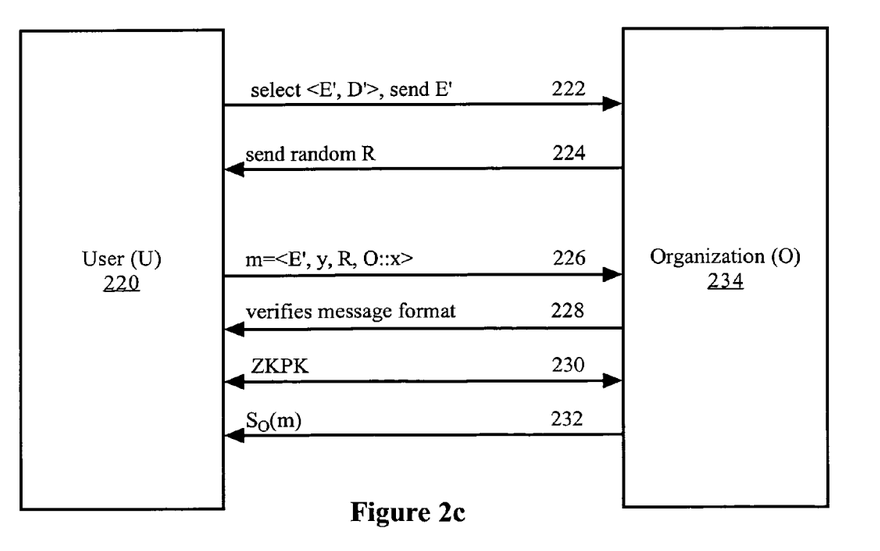

Grant Credentials, GC(O, U, O::x):

First, user U 220 selects a random encryption/decryption pair $<E', D'>$ and sends 222 E' to O 234.

Organization O 234 then selects R at random and sends it 224 to U 220.

U 220 computes $y=E'(D_U \oplus R)$ and sends message $m=<E', y, R, O::x>$ 226 to O 234, who verifies that the format of the message is correct 228.

U 220 initiates and O 234 verifies a ZKPK 230 to prove the following NP statement:

∃s such that $s=D_U$ and $y=E'(s \oplus R)$.

Upon successful verification, O 234 sends the message $\sigma=S_o(m)$ 232 back to U 220 who verifies O's signature. Explicitly, the condition "$s=D_U$" means "$G(s)=(D_U, E_U)$" where G is the key generation algorithm for the public key encryption scheme in use. Here, "s" is the random input for the key generation algorithm.

If any verification step fails, the verifying party assumes that the other party sent an "abort" message.

Figure 2D:
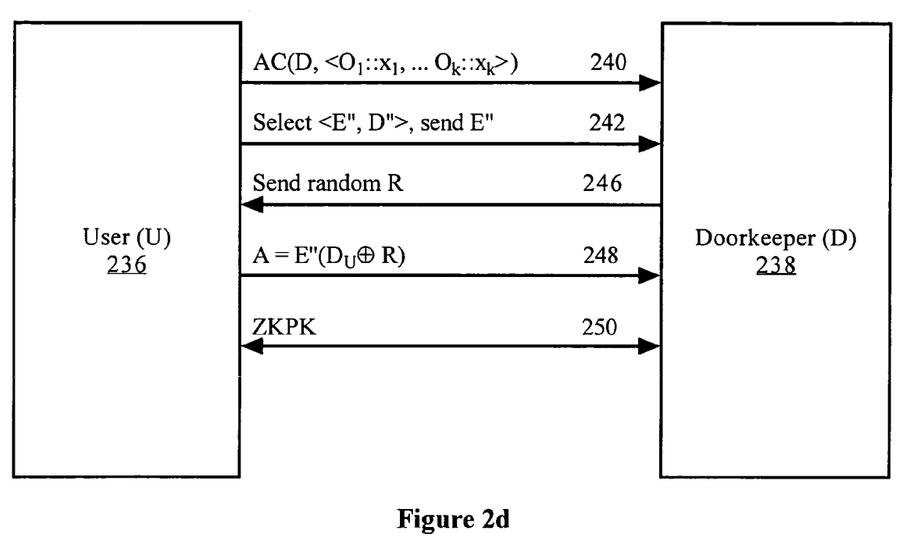
Figure 3A:
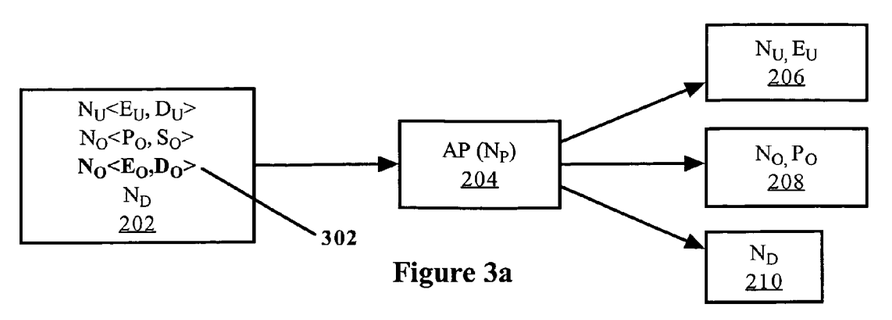
FIGS. 3a–3d together illustrate the four phases of communication of an embodiment of the present invention which provides receipt and tracing functionality.
Figure 3B:
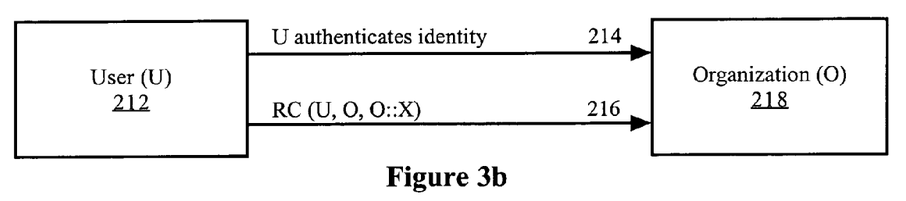
Figure 3C:
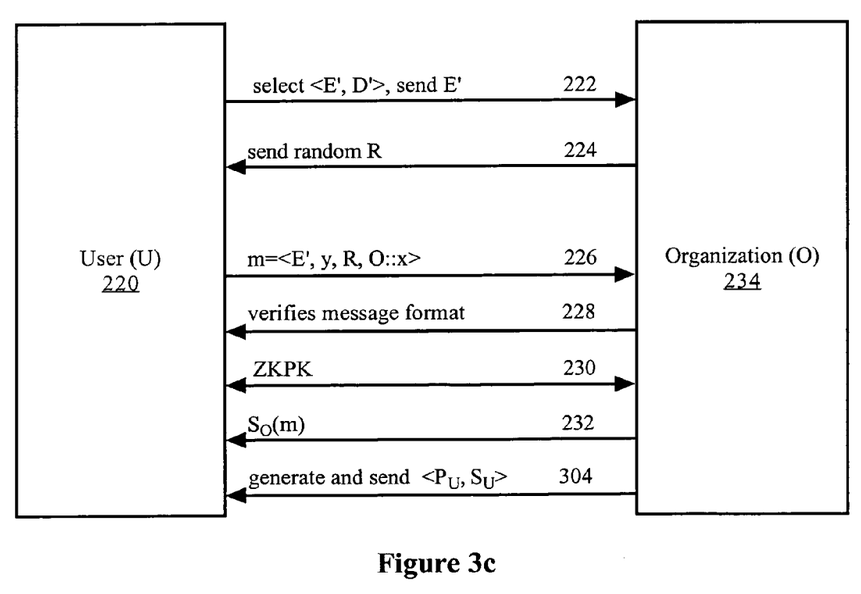
Figure 3D:
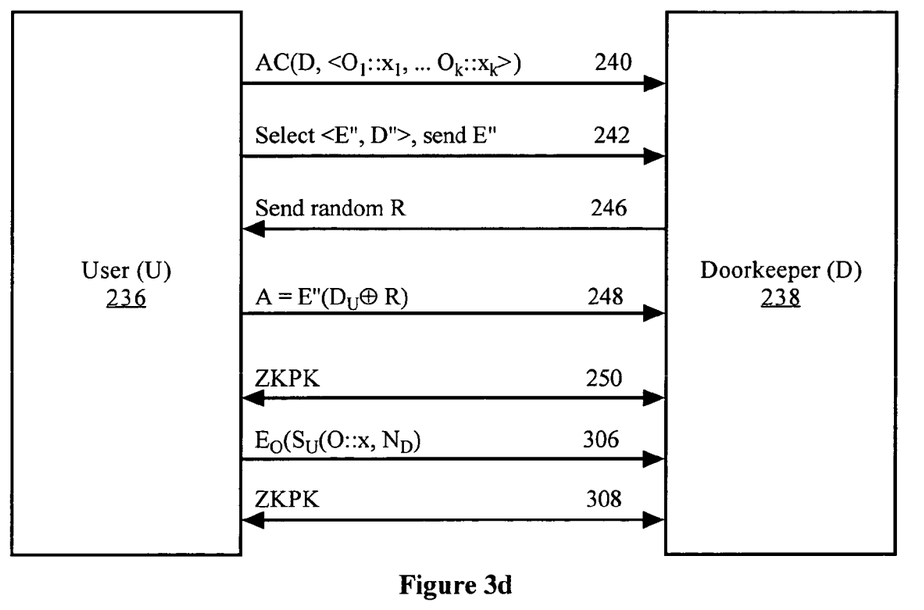

Assert Credentials, AC(D, $<O_1::x_1, \ldots O_k::x_k>$):

If U has been granted credential $O_i::x_i$ then the GC(•) protocol returned a string of the form $\sigma_i=S_{oi}(m_i)$ for the message $m_i=<E'_i, E'_i(s \oplus R_i), R_i, O_i::x_i>$. Now, U 236 sends AC(D, $<O_1::x_1, \ldots O_k::x_k>$) 240 to D 238 who verifies that the format of the message is correct.

U 236 chooses a new encryption/decryption pair $<E'', D''>$ and sends E'' 242 to doorkeeper D 238.

D 238 then sends U 236 a random R' 246.

U 236 sends the message $A=E''(D_U \oplus R')$ 248 to D 238.

Then, U 236 initiates and D 238 verifies a zero-knowledge proof of knowledge 250 to prove the following NP statement:

$\exists \sigma_1, \ldots, \sigma_k, E'_1, \ldots, E'_k, R_1, \ldots, R_k, m_1, \ldots, m_k, s$
such that $\forall i 1 \leq i \leq k, \sigma_i=S_{oi}(m_i)$
and $\forall i 1 \leq i \leq k, m_i=<E'_i, E'_i(s \oplus R_i), R_i, O_i::x_i>$, and
$A=E''(s \oplus R')$.

If verification fails during the first step, D sends an abort message. If D's verification fails during the second step then D proceeds as if the credentials asserted were all invalid. If D's responses during the ZKPK fail then U assumes that D has sent an "abort" message. If all verification succeeds, D proceeds as if the credentials were valid.

This protocol is session non-transferable because each future message m from D to U is encrypted with public key "E", and in addition, its header contains R, $E''(D_U \oplus R)$.

Furthermore, this satisfies the definition of plain non-transferability, as an extractor exists which first runs U independently to obtain a new pair R''', $E''(D_U \oplus R''')$. Then in the middle of the session, if U is able to decrypt E''(m), it is also able to decrypt $E''(D_U \oplus R''')$, and then $D_U$ will have been extracted.

One embodiment of the present invention, illustrated in FIGS. 3a–3d, also contemplates unforgeable receipts while still remaining unlinkable. FIGS. 3a–3d are very similar to FIGS. 2a–2d and only the additional, new message traffic is given different element numbers to assist with identifying those features. To simplify referring back to the following scheme, it is given the label Y. The session non-transferable protocol described above, and illustrated in FIGS. 2a–2d, is augmented by giving organizations public and private keys $E_O$ and $D_O$ 302 (FIG. 3a) for some semantically secure encryption scheme as well as signing keys. During the credential granting phase (FIG. 3c), the organization generates a new signing public private key pair $<P_U, S_U>$ and gives them 304 to the user (and remembers it).

When asserting any credential (FIG. 3d) to a doorkeeper, the user also produces $E_O(S_U(O::x, N_D))$ 306 and proves in zero-knowledge (to D) 308 that it is formed correctly. This is the doorkeeper's receipt. which though unintelligible and unforgeable by D, reveals the identity of the user to O.

Figure 4:
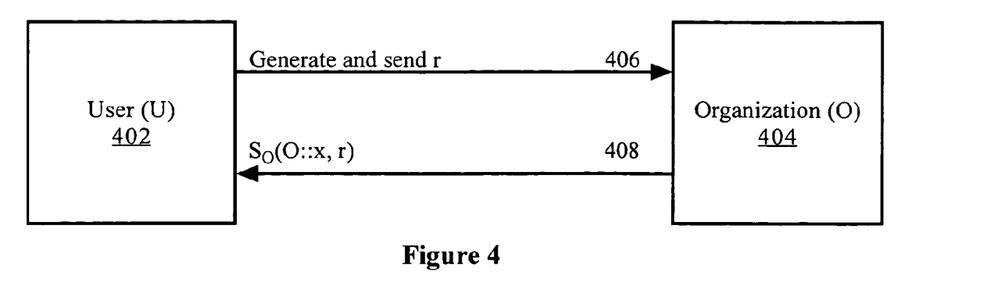
FIG. 4 illustrates additional messages during a credential granting phase which provide linking functionality in the present invention.
Figure 5:
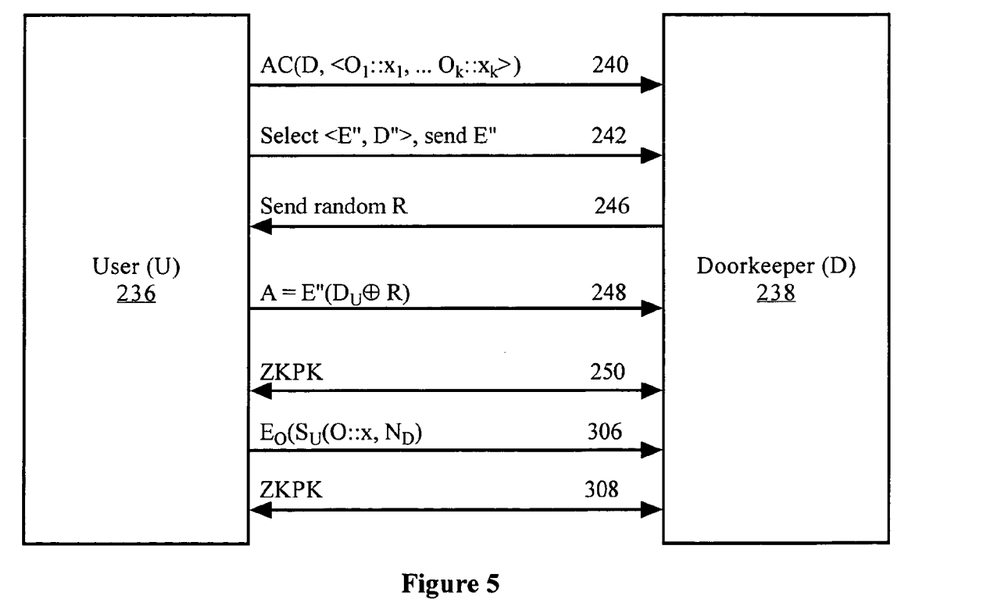
FIG. 5 illustrates additional message during a credential asserting phase which provide traceable, linkable receipts in the present invention.

Extensions to the above scheme that provide both traceability and linkability are straightforward to generate and illustrated in FIG. 4. For instance, during the granting phase, U 402 picks a random number r and sends it 406 to O 404, who sends back $S_O(O::x, r)$ 408 in addition to any other information. During the assertion phase, U is required to send such a signed message along, which is then used for linking and will also identify the user to the granting organization.

Note however that the definition of linkable ANTC-schemes do not enforce an answer to the following question: if user $U_1$ asserts O::x to $D_1$ and user $U_2$ asserts O::x to $D_2$, then are $D_1$ and $D_2$ able to collude to determine $U_1==U_2$? If so, then the scheme is cross-doorkeeper-linkable, otherwise the scheme is single-doorkeeper-linkable.

The linking scheme discussed above provides the same receipt to all doorkeepers, and thus represents a cross-doorkeeper-linkable scheme. The present invention allows each doorkeeper to link assertions of the same credential, but does not allow two colluding doorkeepers to determine whether assertions made to each doorkeeper were made by the same user.

During the grant phase, O sends to U $S_O(s, O::x)$, where s is a seed for a pseudo-random function f. During the assert phase, U sends the pair $(f_s(N_D), f_s(N_D, i))$ to doorkeeper D, where i is the index of the assertion (e.g., in the fifth time U asserts the credential, i=5). U then proves to D in zero-knowledge that there exists an index i, a seed s, and a signature $S_O(s, O::x)$ of the seed and the credential name, such that the pseudo-random function has been correctly applied. The first element of the pair is what is used for linking. The second element is used to provide a strong receipt allowing D to prove to O that a particular user actually visited a certain number of times.

SPECIFIC IMPLEMENTATION

This protocol is based on the hardness of computing discrete logarithms modulo a large prime, and upon a signature scheme that is existentially unforgeable against chosen-message attack.

For this protocol, p is a large prime where p−1 has a large prime factor q. Also, g is a generator of a multiplicative group of the order q in $Z^*_p$.

The master secret of each user U is $D_U$ which is chosen uniformly from $Z_q$. The corresponding public key, $E_U$, is such that $E_U=g^{D_U}$. (Note: All exponentiations are done modulo p)

Request Credential, RC(U, O, O::x):

U identifies himself to O and asks for credential O::x. In addition, U uniformly chooses $r \in Z_q$ and computes $h=g^r$, $h'=g^{rD_U}$ and sends (h, h') to O along with the request for O::x.

U then proves to O in a zero knowledge proof of knowledge that:

$\exists s \in Z_q$ such that $g^s=E_U$ and $h^s=h'$.

This is done via the Chaum-Pedersen protocol, preceded by a roundtrip communication where the verifier (o) commits to its challenge via Pedersen commitment. Details are provided in the appendix.

Grant Credential, GC(O, U, O::x):

Once O and U successfully completes the RC(•) step, and O has agreed to grant U the requested credential, O::x, it signs (h, h') and sends $S_O$(h, h', O::x) to U.

Assert Credential, AC(D, O::x):

U sends <$S_{O1}(m_1)$, ... $S_{ok}(m_k)$> to D where $m_i$=($h_i$, $h_i'$).

U then proves in zero-knowledge that $\exists s \in Z_q$ such that $h_i^s = h_i'$, $\forall 1 \leq i \leq k$.

This is done using a variant of the Schnorr protocol described in the appendix. D accepts the anonymous user when all the proofs of knowledge of the first step have been completed successfully.

Finally, in order to allow D to send encrypted data to U, while making sure that only user U (i.e. the user who knows $D_U$) is able to decipher that data, the players proceed as follows.

U completes the pair h, $D_U$ to a pair of encryption and decryption keys for the Cramer-Shoup encryption scheme. That is, U sets its private key (p, $g_1$, $g_2$, $x_1$, $x_2$, $y_1$, $y_2$, z, H) where $g_1$=h, z=$D_U$; and other parameters are chosen as usual—$g_2$ is another generator of the group generated by $g_1$, H is a target-collision resistant hash function and $x_1$, $x_2$, $y_1$ and $y_2$ are uniformly chosen from $Z_q$. The corresponding public key is (p, $g_1$, $g_2$, c, d, h) where c=$g_1^{x_1} g_2^{x_2}$, d=$g_1^{y_1} g_2^{y_2}$ and h=$g_1^z$. These choices of parameters guarantee that the secret exponent $D_U$ remains protected as long as encryption scheme remains unbroken.

Some real-world applications of the above described protocols are now presented.

Many states are considering a "partner notification" law of the following form: Whenever an individual tests positive for HIV, the testing agency is required to transmit the results of the test to the partner of an individual testing positive. These laws have the unfortunate and unintended consequence that no person can get an HIV test anonymously. Testing agencies require the disclosure of the partner's identity (hence one's identity itself) before performing the test so that they can fully implement the partner notification law. This raises the following question: is the partner notification law inherently incompatible with individual privacy concerns?

A traceable, linkable single-assertion ANTC-scheme with revocations will now be shown to achieve a system in which both partner notification and privacy co-exist.

Informally, a social version of the protocol is the following. When two people get married, they agree on a large random number. This number is sealed in an envelope and signed blindly by an external authority. When either partner goes for an HIV test, the secret number is revealed to the testing center, which, in-turn, makes it public if the test turns out to be positive.

There exists judge J, who acts as a credential-granting organization. The judge is assumed to be "honest but curious". This means J will not collude with other players and will attempt to extract knowledge based on J's past interactions and on publicly available information. Similarly, there exists an honest testing center C who acts as a doorkeeper. Unmarried persons are assumed to possess the credential J::single.

Upon getting married, two users $U_x$ and $U_y$ perform the following interaction with J:

1. $U_x$ and $U_y$ agree upon two random numbers $r_x$ and $r_y$, and together compute $E_C(r_x)$ and $E_C(r_y)$, the encryption of the random numbers under the key of the testing clinic C.
2. $U_x$ and $U_y$ individually send messages to J over the underlying network expressing interest in marrying one-another, including the submessage "$E_C(r_x)$, $E_C(r_y)$".
3. $U_x$ and $U_y$ individually send RC($U_x$, J, J::"married, $E_C(r_x)$") and RC($U_y$, J, J::"married, $E_C(r_y)$") to J.
4. Once J receives a request for a married credential from two users who have expressed interest in marrying one another, he sends GC(J, $U_x$, J::"married, $E_C(r_x)$") to $U_x$ and GC(J, $U_y$, J::"married, $E_C(r_y)$") to $U_y$. At the same time, he publicizes Revoke(J, $U_y$, J::single) and Revoke (J, $U_x$, J::single). The present invention does not require a specific credential-revocation mechanism. Any standard mechanism, as is known to one skilled in this art, can be used.

The protocol for being tested as a single person is to assert a J::single certificate. The clinic will accept the certificate. Perform the test, and inform the user of the result. Since there is no partner, the interaction is straightforward.

The more interesting alternative is when a married user U wished to be tested. U and the clinic perform the following protocol:

1. U asserts a J::"married, $E_c(r)$" certificate for some number r to clinic C.
2. C performs the test. If U tests positive, C decrypts and publishes the number r. Note that the judge cannot link r to any user U.

Another application which benefits from the multiple levels of anonymity allowed by the present invention include web cookies. Web cookies are tokens given from web sites to users visiting the site. Cookies contain a small amount of user-specific information, and allow the site to track a user across multiple visits. When a cookie-holding user revisits a site, the user's web browser automatically forwards the cookie. The site then modifies the cookie and sends it back to the browser based on the user's activity during this visit.

Cookies allow web sites to mine valuable information about user browsing patterns; for example, a cookie-enabled online shopping site may notice that users who buy a road atlas often go on to buy a highway safety kit. This realization allows the site to target advertisements for the safety kit to users who buy road atlases.

Given untraceable, linkable ANTC-scheme, a web site is able to act as both an organization and doorkeeper, allowing access only to those users willing to be tracked anonymously. The individual will be guaranteed anonymity, and the web site will have guaranteed data using credentials that cannot be transferred from one user to another. Furthermore, if the scheme is single-doorkeeper-linkable then the same credential will also provide unlinkable access to different web sites.

Other related applications include distributed file management. Modern file system management schemes often rely on mechanisms such as access control lists, in which users or groups with certain rights to an object are listed explicitly alongside the object. However, knowing who accesses a particular file may provide substantial information to the owner of the filesystem. For example, a company able to know which employees are accessing the corporate policy on giving notice before terminating employment, are able to pressure valuable employees into staying. If rights management is instead performed using an untraceable ANTC-scheme, the corporation will be able to guarantee that only authorized users access any particular file, but will not be able to determine which authorized user is responsible for a particular access.

In the distributed setting, another advantage of such a scheme is that the file manager is able to give a user access to a file that is not accessible at that point in time by either party, and a distributed server is still able to make decisions about the validity of requests even when disconnected from the central file manager, without any replication of access control information.

The final example application of the above protocols is that of non-transferable proxies. A non-transferable anonymous proxy allows an individual U to transfer the right to sign, vote or otherwise act on U's behalf to a number of individuals who cannot further transfer the right, but who are able to perform their function anonymously. For example, the user U, who is the chief editor of a journal, wishes to empower a number of sub-editors with the right to accept or reject papers. Further, the chief editor does not want the sub-editors to be able to transfer this right to individuals U has not approved. The final constraint is that refereeing should be anonymous.

Using an ANTC-scheme, U simply grants to each sub-editor, U', the credential U::"this user may sign and reject papers". U' is able to assert the credential and present an opinion but is unable to transfer it.

CONCLUSION

A method and apparatus has been shown in the above embodiments for requiring a user asserting an anonymous credential to also posses the master key of the user originally granted that credential, in so that any party who successfully asserts possession of the credential has knowledge of the entire master key of the credential holder, thus discouraging transfer of issued credentials to untrusted parties. While various preferred embodiments have been shown and described, it will be understood that there is no intent to limit the invention by such disclosure, but rather, it is intended to cover all modifications and alternate constructions falling within the spirit and scope of the invention as defined in the appended claims. For example, the present invention should not be limited by user interface, computer operating system, computer hardware platform, encryption schemes, network communication protocols, specific zero-knowledge proof mechanisms, or safety features of underlying communication sessions. In addition, the present invention can be implemented locally on a single PC, connected workstations (i.e. networked-LAN), across extended networks such as the Internet or using portable equipment such as laptop computers or wireless equipment (RF, microwaves, infrared, photonic, etc.)

APPENDIX A

1) Chaum-Pederson Proof of equality of discrete logs.

The assumption are that prime p is publicly known, and that both the prover U and the verifier O have g, g', h, and h'. The prover has witness (i.e. knowledge) x such that $g^x=h$ and $g'^x=h'$. The parties proceed as follows:

1. U chooses random generators u, v and sends them to O.
2. O chooses random elements c, s in $Z_q$, computes a commitment $a_0=u^c v^s$ to c, and sends $a_0$ to U.
3. U chooses a random $r \in Z_q$ and sends $a=g^r$ and $a'=g'^r$ to O.
4. O decommits to c (i.e. O sends c, s to U).
5. U verifies that $a_0=u^c v^s$ (and aborts the transaction if the verification fails). U then sends $b=cx+r \pmod q$ to O.
6. If $g^b=h^c a$ and $g'^b=h'^c a'$ then O accepts. Otherwise it rejects.

It can be seen that if U and O follow their protocols, and there exists an x as required, then O accepts. If no valid x exists then O accepts with probability at most 1/q, regardless of U's behavior. Also, the interaction is zero-knowledge.

2) A variant of the Schnorr scheme for proving knowledge of discrete logarithms which adds a roundtrip of commitment, and instructs the prover to reveal the discrete logarithm of v relative to u, at the last round of interaction.

This addition is what allows the interaction to remain a proof of knowledge, while being zero-knowledge. Here the prover U has x, h and $h'=h^x$, and the verifier D has h, h'. The parties proceed as follows:

1. U chooses random generators u and a random exponent $t \in Z_q$. U lets $v=u^t$ and sends (u, v) to D.
2. D chooses random elements c, s in $Z_q$ and computes a commitment $a_0=u^c v^s$ to c. D sends $a_0$ to U.
3. U chooses a random $r \in Z_q$ and sends $a=g^r$ to D.
4. D sends c, s to U.
5. U verifies that $a_0=u^c v^s$ and sends t and $b=cx+r \pmod q$ to D.
6. If $g^b=h^c a$ and $u^t=v$ then D accepts; otherwise it rejects.

It can be seen that if U and D follow their protocols, and $h^x=h'$, then D accepts. Furthermore, if D accepts with non-negligible probability then it is possible to extract x by first running U until the last round and obtaining t; next rewind U to just before step 4, provide U with c' and s' such that $u^{c'} v^{s'}=a_0$, and obtain U's response $b'=c'x+r \pmod q$. The value x is computed from b and b'. Finally, the interaction is (black-box, computational) zero-knowledge.

What is claimed is:

1. A method for accepting from a user an assertion of at least one anonymous credential (AC) granted to a party having a master secret; said master secret comprising a private key, s, of a public/private key encryption pair and said public key, EU, generated by a commitment algorithm, C, performed on private key, s, and denoted C(s), said assertion repeated at least once, said method comprising the steps:

receiving said assertion from said user;
   for said received assertion and each repeated instance, thereof: receiving from said user an initiation of a multi-party protocol in which a prover provides a proof of knowledge of said master secret;
   verifying said proof;
   wherein said proof is a zero knowledge proof of knowledge;
   accepting said at least one AC only if said verifying step is successful, wherein requiring successful completion of said proof for said received assertion and each repeated instance, thereof before accepting said at least one AC prevents transferring said at least one AC without also transferring said master secret, and
   said at least one AC granted by an organization $O_i$ based on receiving a request for each of said at least one AC, $(O_i::x_i)$ from a party, authenticating an identity of said party, generating a message, $m_i=<C(s), (O_i::x_i)>$, generating a signed message $\sigma_i=S_{oi}(m_i)$ wherein $S_{oi}$ is a public signing key of said $O_i$, and sending $\sigma_i$ to said party.

2. A method for accepting from a user an assertion of at least one anonymous credential (AC) granted to a party having a master secret, as per claim 1, wherein said step of accepting said at least one AC is performed by a doorkeeper.

3. A method for accepting from a user an assertion of at least one anonymous credential (AC) granted to a party having a master secret, as per claim 1 wherein said proof comprises proving in zero knowledge:

$\exists \sigma_1, \ldots, \sigma_k, m_1, \ldots, m_k$, s such that $\forall i 1 \leq i \leq k$,
$\sigma_i = S_{Oi}(m_i)$
and $\forall i 1 \leq i \leq k$, $m_i = <C(s), O_i :: x_i>$
and $E_U = C(s)$.

4. A method for accepting from a user an assertion of at least one anonymous credential (AC) granted to a party having a master secret, as per claim 1, wherein said at least one AC is used for one of anonymous health testing, a web cookie, file access control in a distributed filesystem, or a non-transferable proxy power.

5. A method for accepting from a user an assertion of at least on anonymous credential (AC) granted to a party having a master secret, as per claim 1, wherein said method may be implemented locally or remotely on one or more computer based systems, across networks or existing communication mediums.

6. A method for accepting from a user an assertion of at least one anonymous credential (AC) granted to a party having a master secret, as per claim 5, wherein said networks comprise any of: LANs, WANs, cellular, Internet, or Web-based networks.

7. A method of processing at least one anonymous credential (AC) granted to a party having a master secret, $D_U$, comprising the steps:
receiving from a user an assertion of said at least one AC;
receiving from said user an encryption key E";
sending a random number, R, to said user;
receiving $A=E''(D_U \oplus R)$ from said user;
receiving from said user an initiation of an interactive zero knowledge proof of knowledge of said master secret;
verifying said proof of knowledge;
accepting said at least one AC only if said verifying step is successful, and wherein requiring successful completion of said proof of knowledge before accepting said at least one AC prevents transferring said at least one AC without also transferring said master secret, and including E", R and A to provide a non-transferrable session.

8. A method of processing at least one anonymous credential (AC) granted to a party having a master secret, $D_U$, as per claim 7, wherein said AC is granted to said party by an organization.

9. A method of processing at least one anonymous credential (AC) granted to a party having a master secret, $D_U$, as per claim 8, wherein said organization also performs said step of accepting said at least one AC.

10. A method of processing at least one anonymous credential (AC) granted to a party having a master secret, $D_U$, as per claim 7, wherein said step of accepting said at least one AC is performed by a doorkeeper.

11. A method of processing at least one anonymous credential (AC) granted to a party having a master secret, $D_U$, as per claim 7, wherein said master secret is a private key of a public/private encryption key pair.

12. A method of processing at least one anonymous credential (AC) granted to a party having a master secret, $D_U$, as per claim 7, wherein each of said at least one AC is granted by an $O_i$ in accordance with a method comprising the steps:

receiving, by said $O_i$, an encryption key $E_i'$ from said party;
sending a random number, $R_i$, to said party;
receiving from said party a message, $m_i = <E_i', E_i'(D_U \oplus R_i), R_i, O_i :: x_i>$;
verifying a format of said $m_i$;
receiving an initiation of a multi-party protocol in which said party provides a proof of knowledge of $E_i'(D_U \oplus R_i)$;
verifying said proof of knowledge of $E_i'(D_U \oplus R_i)$;
generating a signed message, $\sigma_i = S_{oi}(m_i)$ wherein $S_{oi}$ is a private signing key of $O_i$, and sending said $\sigma_i$ to said party.

13. A method of processing at least one anonymous credential (AC) granted to a party having a master secret, $D_U$, as per claim 12 wherein said proof of knowledge of said master secret comprises proving:

$\exists \sigma_1, \ldots, \sigma_k, E'_1, \ldots, E'_k, R_1, \ldots, R_k, m_1, \ldots, m_k, D_U$ such that $\forall i 1 \leq i \leq k$, $\sigma_i = S_{oi}(m_i)$
and $\forall i 1 \leq i \leq k$, $m_i = <E'_i, E'_i(D_U \oplus R_i), R_i, O_i :: x_i>$, and
$A = E''(D_U \oplus R)$.

14. A method of processing at least one anonymous credential (AC) granted to a party having a master secret, $D_U$, as per claim 7, comprising the additional steps:
receiving a receipt message from said user;
receiving, from said user, an initiation of a zero-knowledge proof of knowledge of said receipt message having a valid format, and
verifying said zero-knowledge proof of knowledge of said receipt message having a valid format.

15. A method of processing at least one anonymous credential (AC) granted to a party having a master secret, $D_U$, as per claim 14, wherein each of said at least one AC is granted by an $O_i$ in accordance with a method comprising the steps:

selecting, by $O_i$, a public/private encryption key pair $<E_{Oi}, D_{Oi}>$;
receiving, by said $O_i$, an encryption key $E_i'$ from said party;
sending a random number, $R_i$, to said party;
receiving from said party a message, $m_i = <E_i', E_i'(D_U \oplus R_i), R_i, O_i :: x_i>$;
verifying a format of said $m_i$;
receiving an initiation of a zero-knowledge proof of knowledge of $E_i'(D_U \oplus R_i)$ from said party;
verifying said zero-knowledge proof of knowledge of $E_i'(D_U \oplus R_i)$;
generating a signed message, $\sigma_i = S_{oi}(m_i)$ wherein $S_{oi}$ is a private signing key of $O_i$;
sending said $\sigma_i$ to said party;
generating an encryption pair $<P_U, S_U>$, and
sending said pair $<P_U, S_U>$ to said party.

16. A method of processing at least one anonymous credential (AC) granted to a party having a master secret, $D_U$, as per claim 15, wherein a doorkeeper, $N_D$, performs said step of accepting said at least one AC and said receipt message comprises $E_{oi}(S_U(O_i :: x_i, N_D))$.

17. A method for accepting from a user an assertion of at least one anonymous credential (AC) granted to a party having a master secret, as per claim 7, wherein said method may be implemented locally or remotely on one or more computer based systems, across networks or existing communication mediums.

18. A method for accepting from a user an assertion of at least one anonymous credential (AC) granted to a party having a master secret, as per claim 17, wherein said networks comprise any of: LANs, WANs, cellular, Internet, or Web-based networks.

19. A method for accepting from a user an assertion of at least one anonymous credential (AC) granted to a party having a master secret, said master secret comprising a private key, s, of a public/private encryption pair and said public key, EU, generated by a commitment algorithm, C, performed on private key, s, and denoted C(s), said assertion repeated at least once, wherein each of said at least one AC is granted by an organization, $O_i$, in accordance with a method comprising the steps:

receiving said assertion from said user;

for said received assertion and each repeated instance, thereof: receiving from said user an initiation of a multi-party protocol in which a prover provides a proof of knowledge of said master secret;

verifying said proof;

wherein said proof is a zero knowledge proof of knowledge;

accepting said at least one AC only if said verifying step is successful, wherein requiring successful completion of said proof for said received assertion and each repeated instance thereof, before accepting said at least one AC, prevents transferring said at least one AC without also transferring said master secret, and said at least one AC granted by an organization $O_i$ being based on receiving a request from a party for said each of said at least one AC, $(O_i::x_i)$, receiving a random number, r, from said party, and sending to said party a message, $S_{oi}(O_i::x_i, r)$, wherein $S_{oi}$ is a private signing key of $O_i$, and wherein $S_{oi}(O_i::x_i, r)$ allows linking of a plurality of assertions of $(O_i::x_i)$, said linking performed by a doorkeeper receiving said plurality of assertions.

20. A method for accepting from a user an assertion of at least one anonymous credential (AC) granted to a party having a master secret, said method comprising:

receiving said assertion from said user;

for said received assertion and each repeated instance, thereof: receiving from said user an initiation of a multi-party protocol in which a prover provides a proof of knowledge of said master secret;

verifying said proof, said verifying said proof comprises said user revealing a discrete logarithm modulo a large prime, q, of a first value, v, relative to a second value, u, said verifying step further comprising:

receiving from said user a pair (u, v) such that $t \in Z_q$ and $v=u^t$;

choosing a first random value $c \in Z_q$, and a second random value, $s \in Z_q$;

computing a commitment, $a_o = u^c v^s$;

sending $a_o$ to said user;

receiving from said user a first value, a, such that r is a random value, $r \in Z_q$, and $a=g^r$;

sending (c, s) to said user;

receiving from said user a second value, b=cx+r(mod q), wherein x is said master secret;

receiving from said user said random exponent t;

comparing a first equality, $g^b = h^c a$, and a second equality, $u^t = v$;

determining verifying said proof is successful if both said first equality and said second equality are true, and wherein p is a large prime number, p−1 has a large prime factor q, g is a generator of a multiplicative group of order q in $Z_p^*$, and $h=g^s$ for some random element $s \in z_q$ chosen by the user, accepting said at least one AC only if said verifying step is successful, wherein requiring successful completion of said proof for said received assertion and each repeated instance thereof, before accepting said at least one AC, prevents transferring said at least one AC without also transferring said master secret.

* * * * *